J. A. HOWE.
PRESSURE INDICATOR.
APPLICATION FILED NOV. 22, 1913.

1,165,006.

Patented Dec. 21, 1915.

Inventor
James A. Howe
By Church & Rich
his Attorneys

Witnesses
Nelson H. Copp
W. E. Stonebraker

UNITED STATES PATENT OFFICE.

JAMES A. HOWE, OF ROCHESTER, NEW YORK, ASSIGNOR TO TAYLOR INSTRUMENT COMPANIES, OF ROCHESTER, NEW YORK, A CORPORATION OF NEW YORK.

PRESSURE-INDICATOR.

1,165,006.  Specification of Letters Patent.  Patented Dec. 21, 1915.

Application filed November 22, 1913. Serial No. 802,498.

*To all whom it may concern:*

Be it known that I, JAMES A. HOWE, of Rochester, in the county of Monroe and State of New York, have invented certain new and useful Improvements in Pressure-Indicators; and I do hereby declare the following to be a full, clear, and exact description of the same, reference being had to the accompanying drawings, forming a part of this specification, and to the reference-numerals marked thereon.

My invention relates to pressure indicators, and it has for its object to afford a construction that is more particularly applicable to instruments designed for delicate work, such as sphygmomanometers and similar surgical devices in which it is essential to secure accurate readings for very slight variations in pressure.

A further object of the invention resides in so constructing the parts as to make the matter of assembling simple, and at the same time to so construct the coöperating elements that their proper operation will be assured under varying conditions.

To these and other ends the invention consists in certain improvements and combinations of parts all as will be hereinafter more fully described, the novel features being pointed out in the claim at the end of the specification.

Figure 1:
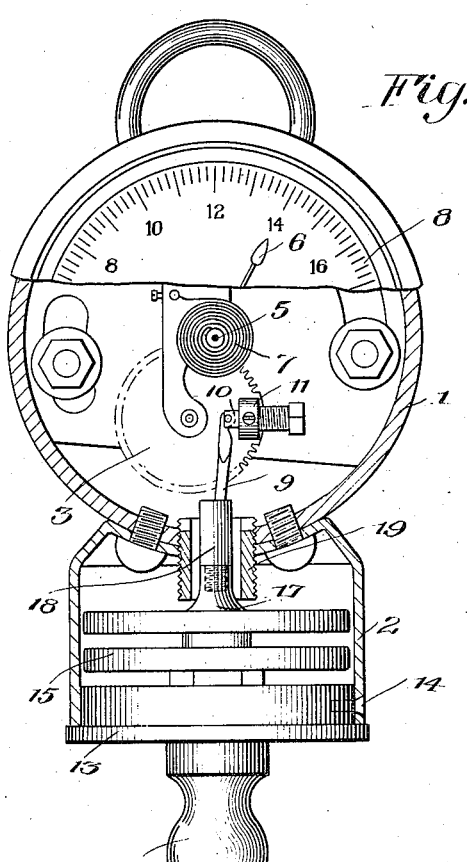
Figure 2:
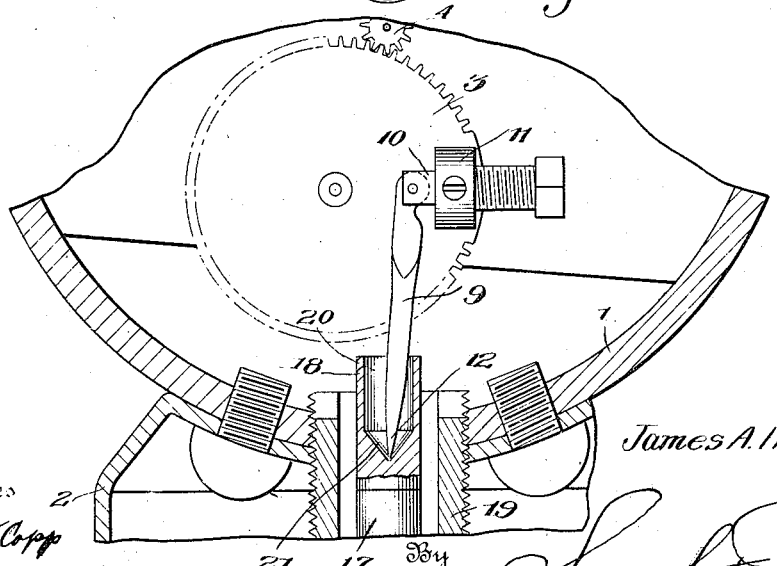

In the drawings: Figure 1 is a plan view, partly in section, showing the application of the improvement to a pressure indicating mechanism, and Fig. 2 is an enlarged sectional view of the same.

Similar reference numerals in the several figures indicate the same parts.

In the present embodiment, I have shown my invention in connection with a pressure indicating mechanism of the type frequently employed in connection with sphygmomanometers and similar instruments, where fine readings are necessary, although the field of application of the improvements is not limited to this specific apparatus. In the present construction, 1 designates a casing including an extension 2 suitably attached to the main portion of the casing. Arranged within the casing 1 is an indicator actuating member consisting of the gear wheel 3 meshing with the pinion 4, the latter being suitably mounted on an arbor 5 which carries the indicator or hand 6, and whose movement is controlled by the coil spring 7. The indicator 6 coöperates with a suitable dial plate 8 which is marked with proper indications, based upon the standard of measure employed. The gear wheel 3 carries a connecter 9 which is preferably pivoted on the arm 10, the latter being threaded in the post or standard 11, which is arranged on the gear wheel 3. The connector 9 has an elongated, reduced free end which is preferably tapered to form a point or sharp bearing 12.

The connector 9 coöperates loosely with a support that is mounted on the pressure operated device; the latter being housed in the extension 2 of the casing. The parts are so arranged that the pressure operated device may be removed from the casing without disturbing the other parts of the mechanism, and so that when the parts are to be assembled, the connector can be readily brought into operative relation with the pressure operated member which it engages, and without requiring a positive connection between these parts. To this end I provide a carrier or plate 13 which is removably positioned within the portion 2 of the casing, and held in fixed position by means of set screws 14, or other suitable means. Said plate 13 carries the pressure operated device or diaphragm structure 15, and 16 is a connection arranged on the plate 13, and communicating with the diaphragm, and to which pressure is supplied through a suitable flexible tube or other connection. The uppermost section of the diaphragm structure 15 carries an upright 17 upon which is removably mounted a post 18, adapted to extend through a collar 19 secured in a suitable opening in the casing. The post 18 is hollow to form an elongated socket 20 which is provided with a countersunk conical base 21 that receives the free end of the connector 9. This affords an extremely efficient bearing for the connector, assuring its contact continually with the center of the socket, and at the same time, space is afforded by the width of the socket for lateral play of the connector as it may be moved in and out by the operations of the diaphragm.

In assembling the parts, the mechanism within the casing is first arranged in proper position, and the carrier with the pressure operated device is then inserted into the portion 2 causing the socket 20 to be projected through the collar 19. It is a comparatively simple matter to insert the free end of the connector within the socket 20 as it is moved inwardly, and when this is done, the carrier can be moved to its innermost position within the casing and securely fixed. This affords a very simple and at the same time extremely efficient connection between the pressure operated device and the indicator actuating member, and the readings that are obtained are as accurate as in constructions where there is a positive connection between the parts referred to. By the arrangement described, I am able to maintain indicator actuating parts, and the pressure operated device, always in the same relation in spite of the fact that there is freedom of movement between the parts.

I claim as my invention:

The combination with an indicator actuating member, of a diaphragm controlling the actuating member, and connections between the actuating member and diaphragm including a post mounted on the actuating member, an arm having threaded engagement with the post, a connector pivoted to said arm having an elongated portion reduced to a point, and a socket carried by the diaphragm and engaging said connector, the socket having a conical base forming a bearing for the connector.

JAMES A. HOWE.

Witnesses:
EDG. W. VOSBURGH,
HERBERT J. WINN.